United States Patent
Wei et al.

(10) Patent No.: US 12,098,452 B2
(45) Date of Patent: Sep. 24, 2024

(54) GRAPHENE/COPPER COMPOSITE DEFORMED COPPER-CHROMIUM-ZIRCONIUM ALLOY LAYERED STRIP AND PREPARATION METHOD THEREOF

(71) Applicant: CHANGZHOU UNIVERSITY, Jiangsu (CN)

(72) Inventors: Wei Wei, Changzhou (CN); Libo Yao, Changzhou (CN); Kunxia Wei, Changzhou (CN); Xulong An, Changzhou (CN); Dandan Wang, Changzhou (CN)

(73) Assignee: CHANGZHOU UNIVERSITY, Changzhou (CN)

( * ) Notice: Subject to any disclaimer, the term of this patent is extended or adjusted under 35 U.S.C. 154(b) by 0 days.

(21) Appl. No.: 18/628,786

(22) Filed: Apr. 7, 2024

(65) Prior Publication Data

US 2024/0254593 A1    Aug. 1, 2024

Related U.S. Application Data

(63) Continuation of application No. PCT/CN2022/096102, filed on May 31, 2022.

(30) Foreign Application Priority Data

Dec. 29, 2021    (CN) .......................... 202111640722.X (51) Int. Cl.
*C22F 1/08*    (2006.01)
*C22C 9/00*    (2006.01)
(Continued)

(52) U.S. Cl.
CPC .................. *C22C 9/00* (2013.01); *C22F 1/08* (2013.01); *C25D 3/38* (2013.01); *C25D 5/34* (2013.01); *C25D 5/50* (2013.01); *C25D 7/0614* (2013.01)

(58) Field of Classification Search
CPC .... C22C 9/00; C22F 1/08; C25D 5/34; C25D 5/50; C25D 7/0614
See application file for complete search history.

(56) References Cited

U.S. PATENT DOCUMENTS

2018/0102197 A1    4/2018    Horst
2022/0162764 A1    5/2022    Wei Wei et al.

FOREIGN PATENT DOCUMENTS

CN        101811046 A    8/2010
CN        103943281 A    7/2014
(Continued)

OTHER PUBLICATIONS

English ABstract and English Machine Translation of Du et al. (Cn 109338148A) (Feb. 16, 2019).*
(Continued)

*Primary Examiner* — Jessee R Roe
(74) *Attorney, Agent, or Firm* — PORUS IP LLC (57) ABSTRACT

A method for preparing a graphene/copper composite deformed copper-chromium-zirconium alloy layered strip is provided. The method includes: obtaining a deformed copper-chromium-zirconium alloy strip by performing a solid solution treatment on a bulk copper-chromium-zirconium alloy, and performing a room temperature equal channel extrusion and a low temperature rolling on the bulk copper-chromium-zirconium alloy after the solid solution; obtaining a graphene/copper composite deformed copper-chromium-zirconium alloy strip by preparing a graphene/copper composite deposition liquid and performing a surface electrodeposition treatment on the deformed copper-chromium-
(Continued)

Graphene/copper deposition layers

Copper-chromium-zirconium alloy strip zirconium alloy strip; obtaining the graphene/copper composite deformed copper-chromium-zirconium alloy layered strip with a rolling deformation of 65%-95% by stacking the graphene/copper composite deformed copper-chromium-zirconium alloy strips for 3-7 layers, and then performing a cold rolling, a single rolling deformation being 5%-10%; and performing a vacuum aging on the graphene/copper composite deformed copper-chromium-zirconium alloy layered strip.

9 Claims, 4 Drawing Sheets

(51) Int. Cl.
    *C25D 3/38*     (2006.01)
    *C25D 5/34*     (2006.01)
    *C25D 5/50*     (2006.01)
    *C25D 7/06*     (2006.01)

(56) References Cited

FOREIGN PATENT DOCUMENTS

| | | | |
|---|---|---|---|
| CN | 104099543 A | 10/2014 | |
| CN | 104294196 A | 1/2015 | |
| CN | 105127197 A | 12/2015 | |
| CN | 105568039 A | 5/2016 | |
| CN | 105845942 A | 8/2016 | |
| CN | 108118180 A | 6/2018 | |
| CN | 109338148 A | * 2/2019 | ............. B22F 3/105 |
| CN | 110125181 A | 8/2019 | |
| CN | 110306137 A | 10/2019 | |
| CN | 110317970 A | 10/2019 | |
| CN | 110629139 A | 12/2019 | |
| CN | 111349810 A | 6/2020 | |
| CN | 112774723 A | 5/2021 | |
| CN | 112981170 A | 6/2021 | |
| CN | 113634597 A | 11/2021 | |
| CN | 113637867 A | 11/2021 | |
| CN | 114309119 A | 4/2022 | |
| CN | 114522677 A | 5/2022 | |
| JP | 2005144492 A | 6/2005 | |
| WO | 2009127901 A1 | 10/2009 | |

OTHER PUBLICATIONS

First Office Action in Chinese Application No. 202111640722.X mailed on Jun. 30, 2023, 13 pages.
Notification to Grant Patent Right for Invention in Chinese Application No. 202111640722.X mailed on Sep. 16, 2023, 6 pages.
I.S. Batra et al., Microstructure and Properties of a Cu—Cr—Zr Alloy, Journal of Nuclear Materials, 299(2): 91-100, 2001.
R. Mishnev et al., Deformation Microstructures, Strengthening Mechanisms, and Electrical Conductivity in a Cu—Cr—Zr Alloy, Materials Science & Engineering A, 629: 29-40, 2015.
International Search Report in PCT/CN2022/096102 mailed on Sep. 7, 2022, 8 pages.
Written Opinion in PCT/CN2022/096102 mailed on Sep. 7, 2022, 7 pages.

* cited by examiner

Graphene/copper deposition layers

Copper-chromium-zirconium alloy strip

GRAPHENE/COPPER COMPOSITE DEFORMED COPPER-CHROMIUM-ZIRCONIUM ALLOY LAYERED STRIP AND PREPARATION METHOD THEREOF

CROSS-REFERENCE TO RELATED APPLICATIONS

This application is a Continuation of international application No. PCT/CN2022/096102 filed on May 31, 2022, which claims priority to Chinese Patent Application No. 202111640722.X, filed on Dec. 29, 2021, the entire contents of each of which are incorporated herein by reference.

TECHNICAL FIELD

The present disclosure relates to the field of conductor and thermal conductive materials, and in particular, to a graphene/copper composite deformed copper-chromium-zirconium alloy layered strip and a preparation method thereof.

BACKGROUND

Simple copper alloys have an excellent electrical conductivity and good mechanical properties, so they are widely used in the fields of electronic information, new energy vehicles, aerospace, and aviation, etc. Moreover, strip and foil products made of the copper alloys are extensively applied in lead frames, integrated circuits, precision electronic components, and other aspects. With an advent of 5G era and a rapid development of new energy electric vehicles, a high reliability and a long service life are becoming goals of conductor material development. In the future, a large number of reliable, highly efficient copper alloy strips with more demanding conditions and more complex functions are required. This requires the copper alloy strips to not only have a high strength and an excellent electrical conductivity, but also have a suitable plasticity and an excellent thermal conductivity.

A traditional heat dissipation for electrical devices is achieved by using copper as a heat dissipation film, which has excellent mechanical and electrical conductivity properties and is suitable for most electrical devices. But heat dissipation problems often happen after a period of work, resulting in the devices being overheated and thus affecting a work efficiency.

Copper-chromium-zirconium alloys are precipitation-strengthened copper alloys, the mechanical properties of which may be enhanced through a deformation heat treatment, but a comprehensive performance of which is not significantly improved. In recent years, high thermal and electrical conductivity copper alloys have been obtained by deposition on the surface of the copper alloys, especially an application of graphene composite copper materials on the surface of copper alloys such as a vapor deposition, an electrodeposition, and a powder metallurgy method, etc., but these methods mostly modify the surface of copper alloys. For an actual application of monolithic materials, surface modification alone is far from sufficient. Therefore, there is a need to provide an alloy strip with a high strength, an excellent electrical conductivity, as well as a suitable plasticity and an excellent thermal conductivity.

SUMMARY

Embodiments of the present disclosure provide a method for preparing a graphene/copper composite deformed copper-chromium-zirconium alloy layered strip, including: (1) obtaining a deformed copper-chromium-zirconium alloy strip by performing a solid solution treatment on a bulk copper-chromium-zirconium alloy, and performing a room temperature equal channel extrusion and a low temperature rolling on the bulk copper-chromium-zirconium alloy after the solid solution; (2) obtaining a graphene/copper composite deformed copper-chromium-zirconium alloy strip by preparing a graphene/copper composite deposition liquid and performing a surface electrodeposition treatment on the deformed copper-chromium-zirconium alloy strip; (3) obtaining the graphene/copper composite deformed copper-chromium-zirconium alloy layered strip with a rolling deformation of 65%-95% by stacking the graphene/copper composite deformed copper-chromium-zirconium alloy strips for 3-7 layers, and then performing a cold rolling; and a single rolling deformation being 5%-10%; (4) performing a vacuum aging on the graphene/copper composite deformed copper-chromium-zirconium alloy layered strip.

In some embodiments, a thickness of the bulk copper-chromium-zirconium alloy in step (1) is 1-1.2 cm; an elemental composition of the bulk copper-chromium-zirconium alloy consists of 0.5 wt %-1.0 wt % of Cr, 0.05 wt %-0.1 wt % of Zr, and a residual amount of Cu; a solid solution temperature in the solid solution treatment is 1000° C.-1050° C., after the bulk copper-chromium-zirconium alloy is held at a temperature of 1000° C.-1050° C. for 0.5-1 h, performing a quenching on the bulk copper-chromium-zirconium alloy with a deionized water.

In some embodiments, the number of processing times of the room temperature equal channel extrusion in step (1) is 1-4; the low temperature rolling is performed after the bulk copper-chromium-zirconium alloy is soaked in liquid nitrogen for 5-10 min; a low temperature rolling deformation of the bulk copper-chromium-zirconium alloy is 98±1%, and a single low temperature rolling deformation is 10%-15%, the thickness of the deformed copper-chromium-zirconium alloy strip is 0.2-0.3 mm.

In some embodiments, the composition of the graphene/copper composite deposition liquid in step (2) consists of: 80-120 g/L of copper sulfate pentahydrate, 0.5-2 g/L of graphene, 5-25 mg/L of gelatin, 5-15 mg/L of polyacrylamide, 0.6-1.2 g/L of sodium dodecyl sulfonate, and a residual amount of a deionized water.

In some embodiments, a preparation manner of the graphene/copper composite deposition liquid in step (2) includes: mixing the copper sulfate pentahydrate, the gelatin and the polyacrylamide and dispersing for 30 min at a speed of 200 r/min using a mechanical stirring to obtain a solution containing the copper sulfate pentahydrate; mixing the graphene and the sodium dodecyl sulfate to obtain a mixture, performing an ultrasonic dispersion on the mixture for 30 min, and then performing a high-speed homogeneous dispersion for 60 min at a speed of 4000 r/min to obtain a graphene suspension; mixing the solution containing the copper sulfate pentahydrate with the graphene suspension, stirring mechanically, and then performing the high-speed homogeneous dispersion by stirring using an electric mixer to obtain the graphene/copper composite deposition liquid.

In some embodiments, the method further comprises: in step (2), before performing the surface electrodeposition treatment, sequentially polishing a surface of the deformed copper-chromium-zirconium alloy strip with 500, 1000 and 1500 grit sandpapers, and pickling and activating the surface of the deformed copper-chromium-zirconium alloy strip with an activation fluid. Components of the activation fluid consists of 30 mL hydrochloric acid and 300 mL deionized water.

In some embodiments, the surface electrodeposition treatment in step (2) adopts a direct current electrodeposition method, an electrolyte pH of the surface electrodeposition is 1-2.5, an electrolyte temperature is 20° C.-50° C., a current density is 60-120 mA/cm², and a deposition time is 60-120 min; a single-layer graphene composite copper thickness of the obtained graphene/copper composite deformed copper-chromium-zirconium alloy strip is 0.1-0.4 mm.

In some embodiments, a vacuum degree of the vacuum aging in step (4) is $10^{-5}$ Pa, an aging temperature is 400° C.-450° C., and an aging holding time is 0.5-1 h; and the graphene/copper composite deformed copper-chromium-zirconium alloy layered strip heats up and cools down with a furnace.

Embodiments of the present disclosure also provide a graphene/copper composite deformed copper-chromium-zirconium alloy layered strip.

Beneficial effects of the present disclosure are as follow.
(1) Through performing two intense plastic deformations on the bulk copper-chromium-zirconium alloy, a hardness and strength of a material can be improved. By adopting the simple method of the direct current electrodeposition for the surface electrodeposition treatment, the deposited layer is uniform and dense, which has a good thermal conductivity and plasticity. For the overall material, the direct current electrodeposition method can greatly improve the thermal and electrical conductivity of the material.
(2) By stacking composite strips for the cold rolling, a bonding strength of the graphene/copper and the copper alloy strips can be improved, and a compactness of the graphene/copper composites can be improved.
(3) After the layered composite strips are aged, an overall property, such as an electrical and thermal conductivity, a strength, and a plasticity of the strips, are adjusted.

BRIEF DESCRIPTION OF THE DRAWINGS

The present disclosure is further illustrated by way of exemplary embodiments, which is described in detail by means of the accompanying drawings. These embodiments are not limiting, and in these embodiments, the same numbering denotes the same structure, wherein.

DETAILED DESCRIPTION

Figure 1:
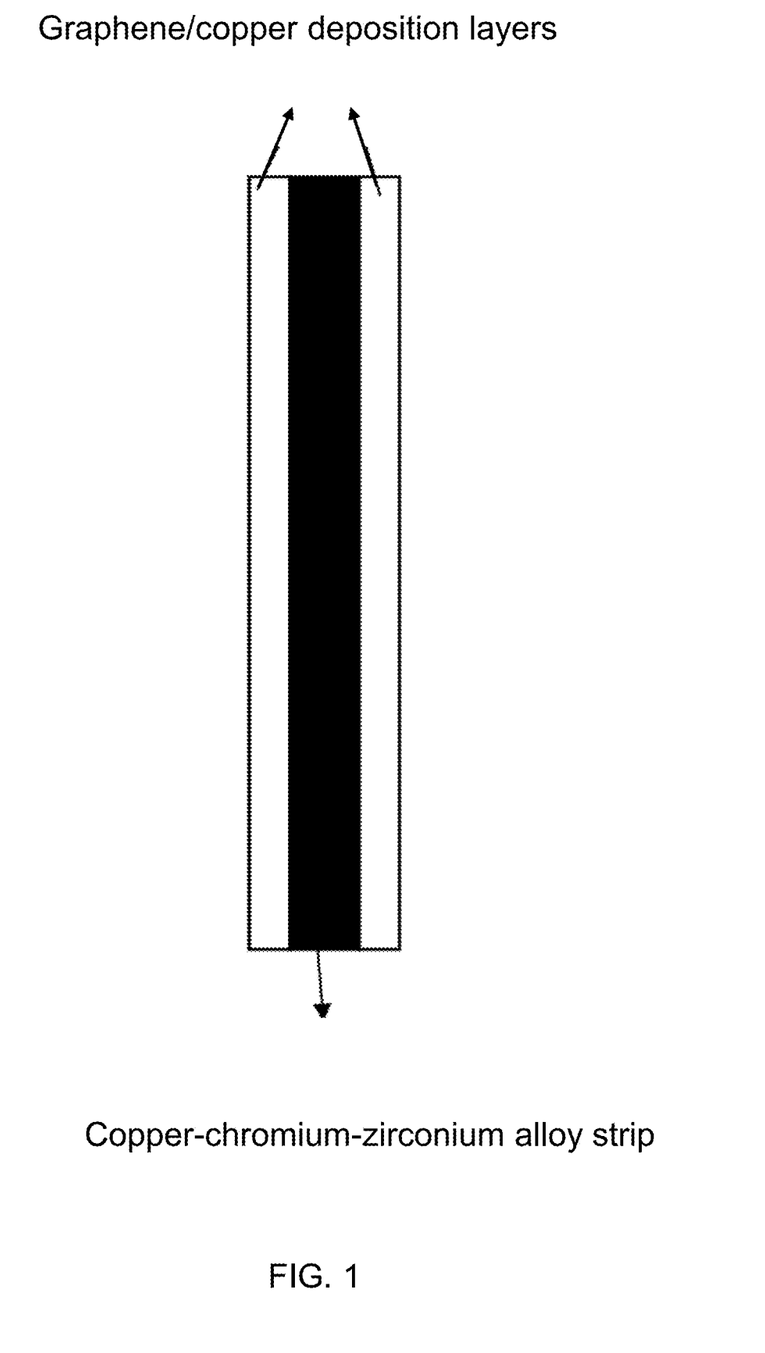
FIG. 1 is a schematic diagram illustrating a structure of a graphene/copper composite deformed copper-chromium-zirconium alloy layered strip according to some embodiments of the present disclosure.
Figure 2:
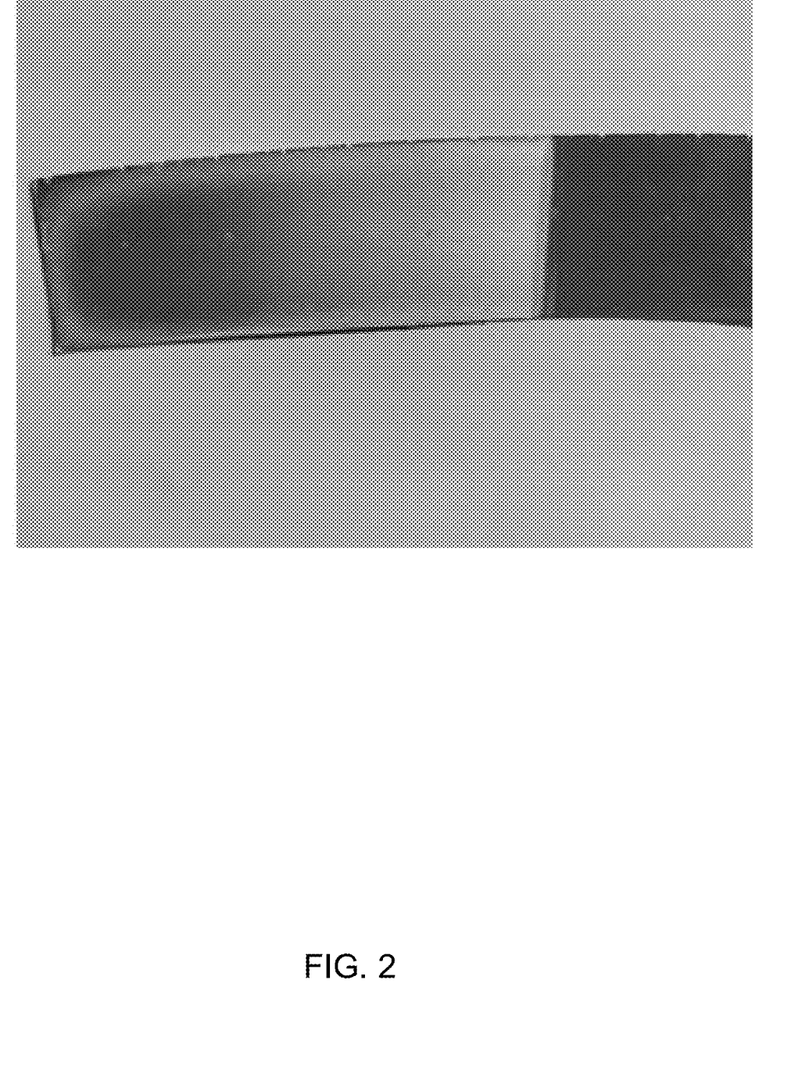
FIG. 2 is an actual diagram illustrating a single layer of a graphene/copper composite deformed copper-chromium-zirconium alloy according to some embodiments of the present disclosure.
Figure 3:
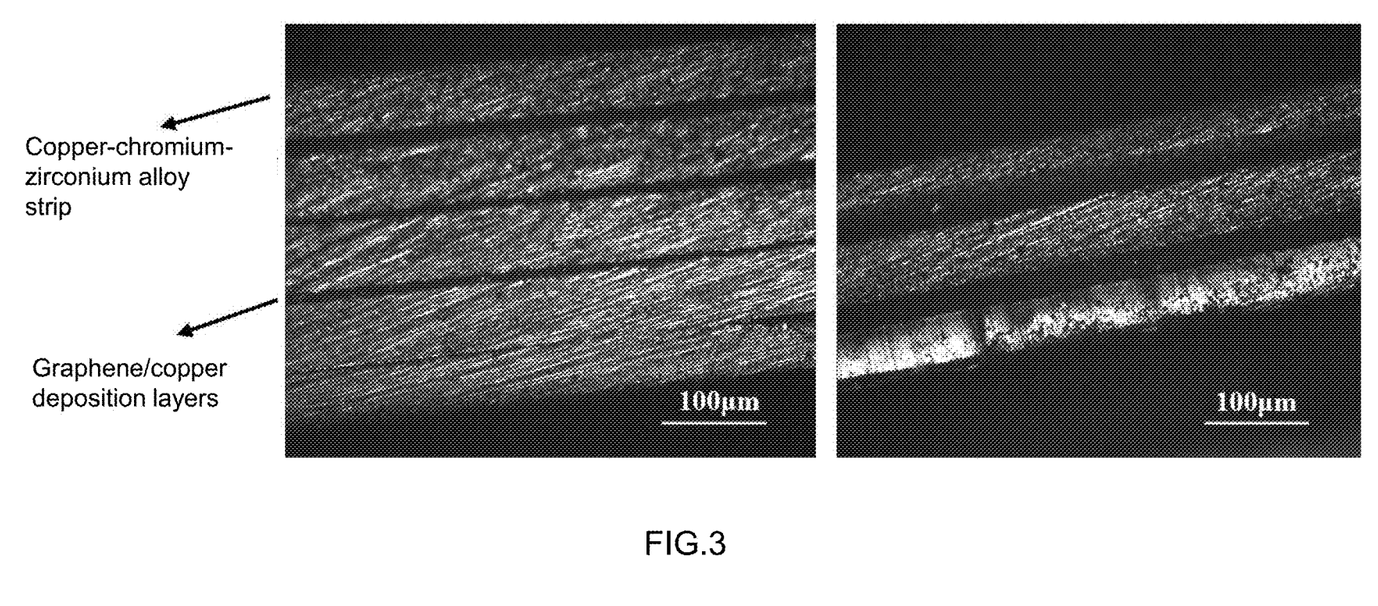
FIG. 3 is an actual diagram illustrating a graphene/copper composite deformed copper-chromium-zirconium alloy strip stacked with 3 and 5 layers according to some embodiments of the present disclosure.
Figure 4:
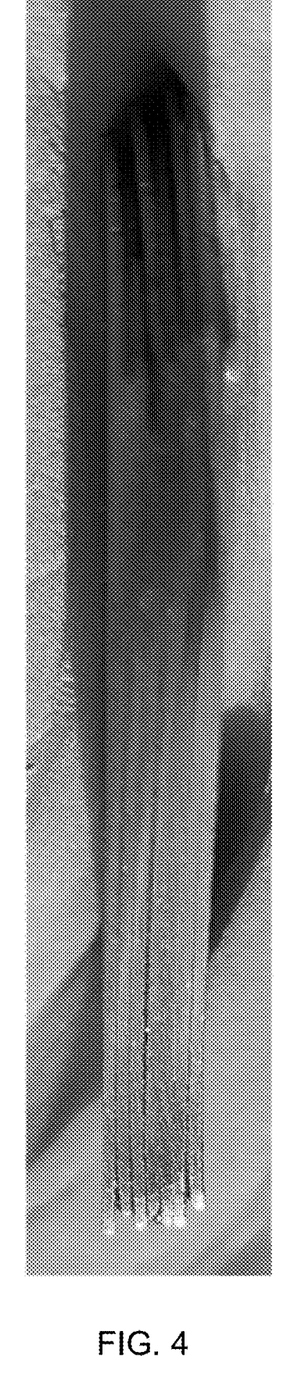
FIG. 4 is an actual diagram illustrating a graphene/copper composite deformed copper-chromium-zirconium alloy strip stacked with 7 layers according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for those skilled in the art to apply the present disclosure to other similar scenarios in accordance with these drawings without creative labor. The present disclosure may be applied to other similar scenarios as well. Unless obviously obtained from the context or the context illustrates otherwise, the same numeral in the drawings refers to the same structure or operation.

As shown in the present disclosure and the claims, unless the context clearly suggests an exception, the words "one," "a," "an," and/or "the" do not refer specifically to the singular, but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Embodiments of the present disclosure provide a method for preparing a graphene/copper composite deformed copper-chromium-zirconium alloy layered strip, including following steps.

Step (1): obtaining a deformed copper-chromium-zirconium alloy strip by performing a solid solution treatment on a bulk copper-chromium-zirconium alloy, and performing a room temperature equal channel extrusion and a low temperature rolling on the bulk copper-chromium-zirconium alloy after the solid solution.

The copper-chromium-zirconium alloy is mainly a copper-based metal alloy material with an addition of metal chromium and metal zirconium, which has a good electrical and thermal conductivity, a high hardness, a wear resistance, an anti-explosive feature, and a good upright stability. The copper-chromium-zirconium alloy is commonly used for high-conductivity, electrical conductivity, and high thermal intensity parts such as conductive blocks, electrodes, and molds, etc.

In some embodiments, an elemental composition of the bulk copper-chromium-zirconium alloy in step (1) may consist of 0.5 wt %-1.0 wt % of Cr, 0.05 wt %-0.1 wt % of Zr, and a residual amount of Cu.

In some embodiments, the elemental composition of the bulk copper-chromium-zirconium alloy may consist of 0.5 wt % of Cr, 0.05 wt % of Zr, a residual amount of Cu.

In some embodiments, the elemental composition of the bulk copper-chromium-zirconium alloy may consist of 0.75 wt % of Cr, 0.1 wt % of Zr, a residual amount of Cu.

In some embodiments, the elemental composition of the bulk copper-chromium-zirconium alloy may consist of 1.0 wt % of Cr, 0.1 wt % of Zr, a residual amount of Cu.

In some embodiments, a thickness of the block copper-chromium-zirconium alloy may be 1-1.2 cm.

In some embodiments, a thickness of the bulk copper-chromium-zirconium alloy may be 1 cm, 1.1 cm, or 1.2 cm, etc.

The solid solution treatment refers to a heat treatment process in which the alloy is heated to a high-temperature single-phase region and maintained at a constant temperature, so that excess phases are sufficiently dissolved into a solid solution and then cooled rapidly to obtain a supersaturated solid solution. The solid solution treatment may make various phases in the alloy fully dissolve, strengthen the solid solution, and improve a toughness and corrosion resistance, eliminating a stress and softening for further processing or molding.

In some embodiments, a solid solution temperature in the solid solution treatment may be 1000° C.-1050° C., and after the bulk copper-chromium-zirconium alloy is held at a temperature of 1000° C.-1050° C. for 0.5-1 h, a quenching may be performed on the bulk copper-chromium-zirconium alloy with a deionized water.

In some embodiments, a solid solution temperature in the solid solution treatment may be 1000° C., 1010° C., 1020° C., 1030° C., 1040° C., or 1050° C., and the holding time may be 0.5 h, 0.6 h, 0.7 h, 0.8 h, 0.9 h, or 1 h, etc.

The quenching refers to a manner for heat treatment for alloys in which the alloy is heated to a certain high temperature, then cooled rapidly with water, oil, or air, thereby hardening a surface of the alloy. After quenching, the alloy may have greater hardness and strength.

A room temperature equal channel extrusion refers to a deformation process in which a sample is pressed into an equal channel die to achieve a large deformation at 20° C.-35° C.

In some embodiments, a number of processing times of the room temperature equal channel extrusion in step (1) may be 1-4 passes.

In some embodiments, the number of processing times of the room temperature equal channel extrusion in step (1) may be 1, 2, 3, or 4 passes, etc.

The low temperature rolling refers to a rolling when the alloy is heated to a temperature below a regular hot rolling temperature. The low temperature rolling may save energy, reduce oxidative burns, reduce fatigue cracks in rolls due to a thermal stress, and reduce a wear and tear of the rolls caused by iron oxide in the heating process.

In some embodiments, the low temperature rolling may be performed after the bulk copper-chromium-zirconium alloy is soaked in liquid nitrogen for 5-10 min; a low temperature rolling deformation of the bulk copper-chromium-zirconium alloy may be 98±1%, and a single low temperature rolling deformation may be 10%-15%, a thickness of the deformed copper-chromium-zirconium alloy strip obtained may be 0.2-0.3 mm.

The rolling deformation refers to a difference in dimensions before and after the deformation of the alloy in the alloy rolling process.

Step (2): obtaining a graphene/copper composite deformed copper-chromium-zirconium alloy strip by preparing a graphene/copper composite deposition liquid and performing a surface electrodeposition treatment on the deformed copper-chromium-zirconium alloy strip.

The surface electrodeposition treatment refers to a formation of a metal plating on the surface of an alloy. In the process, under an action of a direct current electric field, a circuit may be formed in an electrolyte liquid (a plating liquid) by an anode and a cathode, so that the solution of metal ions is deposited onto a surface of the cathode plated parts. The surface electrodeposition treatment may improve a conductivity, a strength, and a heat resistance of the alloy.

In some embodiments, a composition of the graphene/copper composite deposition liquid in step (2) may consist of: 80-120 g/L of copper sulfate pentahydrate, 0.5-2 g/L of graphene, 5-25 mg/L of gelatin, 5-15 mg/L of polyacrylamide, 0.6-1.2 g/L of sodium dodecyl sulfonate, and the residual amount of a deionized water.

In some embodiments, a preparation manner of the graphene/copper composite deposition liquid in step (2) may include: mixing the copper sulfate pentahydrate, the gelatin and the polyacrylamide, and dispersing for 30 min at a speed of 200 r/min using a mechanical stirring to obtain a solution containing the copper sulfate pentahydrate; mixing the graphene and the sodium dodecyl sulfate to obtain a mixture, performing an ultrasonic dispersion on the mixture for 30 min, and then performing a high-speed homogeneous dispersion for 60 min at a speed of 4000 r/min to obtain a graphene suspension; mixing the solution containing the copper sulfate pentahydrate with the graphene suspension, stirring mechanically, and then performing the high-speed homogeneous dispersion by stirring using an electric mixer to obtain the graphene/copper composite deposition liquid.

In some embodiments, in step (2), before performing the surface electrodeposition treatment, a surface of the deformed copper-chromium-zirconium alloy strip may be sequentially polished with 500, 1000 and 1500 grit sandpapers, and a pickling activation treatment may be performed on the surface of the deformed copper-chromium-zirconium alloy strip with an activation fluid. A composition of the activation fluid may consist of 30 mL hydrochloric acid and 300 mL deionized water. Before performing the surface electrodeposition treatment, the pickling activation treatment may remove contaminants on the surface of deformed copper-chromium-zirconium alloy strips, clean the surface, and at the same time, form a micro-thin layer of oxide on the surface of the alloy, which is highly adhesive, so as to enhance an adhesion between a plating layer and the alloy, and improve a corrosion resistance and stability of the plating layer.

In some embodiments, the surface electrodeposition treatment in step (2) may adopt a direct current electrodeposition method, an electrolyte pH of the surface electrodeposition may be 1-2.5, an electrolyte temperature may be 20° C.-50° C., a current density may be 60-120 mA/cm$^2$, and a deposition time may be 60-120 min; a single-layer graphene composite copper thickness of the obtained graphene/copper composite deformed copper-chromium-zirconium alloy strip may be 0.1-0.4 mm.

Step (3): obtaining the graphene/copper composite deformed copper-chromium-zirconium alloy layered strip with a rolling deformation of 65%-95% by stacking the graphene/copper composite deformed copper-chromium-zirconium alloy strips for 3-7 layers, and then performing a cold rolling. A single rolling deformation may be 5%-10%;

The cold rolling refers to the rolling of alloys at a temperature below a recrystallization temperature. The alloy may be processed into different shapes by the cold rolling.

Step (4): performing a vacuum aging on the graphene/copper composite deformed copper-chromium-zirconium alloy layered strip.

The vacuum aging refers to a phenomenon where the alloy undergoes significant changes in strength and hardness over time after the solid solution treatment, the high-temperature quenching, or a certain degree of cold processing deformation, and then stored in a vacuum environment at a higher temperature or the room temperature for a longer period of time. The vacuum aging may lead to an increase in an elastic limit of the alloy, resulting in an improved hardness and strength of the alloy.

In some embodiments, a vacuum degree of the vacuum aging in step (4) may be 10.5 Pa, an aging temperature may be 400° C.-450° C., and an aging holding time may be 0.5-1 h, and the graphene/copper composite deformed copper-chromium-zirconium alloy layered strip heats up may heat up and cool down with a furnace. The graphene/copper composite deformed copper-chromium-zirconium alloy layered strip heats up heats up with the furnace refers to that the cold alloy is put into a cold vacuum aging furnace and then heated with the aging furnace to a specified temperature; and the graphene/copper composite deformed copper-chromium-zirconium alloy layered strip cools down with the furnace refers to that after the holding time, the heating in the furnace is stopped, and the alloy in the vacuum aging furnace cools slowly down to the room temperature with the furnace.

Embodiments of the present disclosure also provide a graphene/copper composite deformed copper-chromium-zirconium alloy layered strip.

EMBODIMENTS

The following embodiments are some more specific illustrations associated with the above embodiments. Some of these embodiments may also be replaced or combined with corresponding elements in other embodiments to form new embodiments. The experimental methods in the following embodiments are conventional if not otherwise stated. The experimental materials used in the following embodiments are, if not otherwise specified, obtained by purchase from a conventional biochemical reagent company. The quantitative tests in the following embodiments were set up with three repetitions of the experiment, and the results were averaged. It should be appreciated that the following embodiments are intended to better explain the present disclosure and are not intended to limit the present disclosure.

The present disclosure is further detailed below in conjunction with the embodiments: in the following embodiments, the thickness of a bulk copper-chromium-zirconium alloy was 12 mm, an elemental content of the bulk copper-chromium-zirconium alloy consisted of 0.5 wt %-1.0 wt % of Cr, 0.05 wt %-0.1 wt % of Zr, a residual amount of Cu. The bulk copper-chromium-zirconium alloy was held at a temperature of 1050° C. for 1 h to perform a solid solution treatment and a quenching. A deformed copper-chromium-zirconium alloy strip was obtained by performing a room temperature equal channel extrusion and a low temperature rolling on the bulk copper-chromium-zirconium alloy after the solid solution and the quenching. An inner angle of an equal channel extrusion die was 110°, an outer angle was 0°, an extrusion speed was 15 mm/min, a lubricant was a mixture of $MoS_2$ and oil (2:1), and in the equal channel extrusion, the extrusion was performed in a Ba-path mode (i.e., a sample was extruded by alternately rotating the rotating 90 degrees clockwise and counter clockwise with its longitudinal axis as the axis) after each pass). After the end of the equal channel extrusion, the low temperature rolling was performed after the bulk copper-chromium-zirconium alloy was soaked in liquid nitrogen for 5-10 min.

A composition of the electrodeposition liquid consisted of: 80-120 g/L of copper sulfate pentahydrate, 0.5-2 g/L of graphene, 5-25 mg/L of gelatin, 5-15 mg/L of polyacrylamide, 0.6-1.2 g/L of sodium dodecyl sulfate, and a residual amount of a deionized water. An electrolyte temperature was 20° C.-50° C.

Embodiment 1

The elemental content of the bulk copper-chromium-zirconium alloy after the solid solution consisted of 0.5 wt % of Cr, 0.05 wt % of Zr, a residual amount of Cu. An intense plastic deformation was performed on the bulk copper-chromium-zirconium alloy after the solid solution, and a low temperature rolling deformation was 98±1% after 1 pass extrusion; a single low temperature rolling deformation was 15%, and a deformed copper-chromium-zirconium alloy strip with a thickness of 0.2 mm was obtained. After that, a surface electrodeposition treatment was performed on the deformed copper-chromium-zirconium alloy strip, and a composition of the deposition liquid consisted of 80 g/L of copper sulfate pentahydrate, 0.5 g/L of graphene, 5 mg/L of gelatin, 5 mg/L of polyacrylamide, 0.6 g/L of sodium dodecyl sulfate, and a residual amount of the deionized water. An electrolyte pH of the surface electrodeposition was 1, a deposition temperature was 30° C., a current density was 60 mA/cm$^2$, a deposition time was 60 min, and a deposition thickness was 0.2 mm. A cold rolling was performed on the graphene/copper composite deformed copper-chromium-zirconium alloy strip with a rolling deformation of 66±1% and a single rolling deformation of 10%, and a single-layer graphene/copper composite deformed copper-chromium-zirconium alloy strip with a thickness of 0.2 mm was obtained. After that, a vacuum aging treatment was performed on the graphene/copper composite deformed copper-chromium-zirconium alloy strip at an aging temperature of 400° C. and an aging time of 0.5 h. The graphene/copper composite deformed copper-chromium-zirconium alloy layered strip under the situation and process condition has a strength of 600±10 MPa, an electrical conductivity of 75±1% IACS, and a thermal conductivity of 600 W/m·k. An elongation after break is 10%.

A preparation manner for the graphene/copper composite deposition liquid included: mixing the copper sulfate pentahydrate, the gelatin and the polyacrylamide and dispersing for 30 min at a speed of 200 r/min using a mechanical stirring to obtain a solution containing the copper sulfate pentahydrate; mixing the graphene and the sodium dodecyl sulfate to obtain a mixture, performing an ultrasonic dispersion on the mixture for 30 min, and then performing a high-speed homogenization for 60 min at a speed of 4000 r/min to obtain a graphene suspension; mixing the solution containing the copper sulfate pentahydrate with the graphene suspension, stirring mechanically, and then performing the high-speed homogeneous dispersion by stirring using an electric mixer to obtain the graphene/copper composite deposition liquid.

The surface of the deformed copper-chromium-zirconium alloy strip was polished with 500, 1000 and 1500 grit sandpapers, and the surface of the deformed copper-chromium-zirconium alloy strip was pickled and activated with an activation fluid. The strip was connected to a cathode and a titanium plate was connected to the anode.

Embodiment 2

The elemental content of the bulk copper-chromium-zirconium alloy after the solid solution consisted of 0.75 wt % of Cr, 0.1 wt % of Zr, a residual amount of Cu. The intense plastic deformation was performed on the bulk copper-chromium-zirconium alloy after the solid solution, and the low temperature rolling deformation was 98±1% after 2 passes extrusion; the single low temperature rolling deformation was 15%, and the deformed copper-chromium-zirconium alloy strip with a thickness of 0.2 mm was obtained. After that, the surface electrodeposition treatment was performed on the deformed copper-chromium-zirconium alloy strip, and the composition of the deposition liquid consisted of 100 g/L of copper sulfate pentahydrate, 1 g/L of graphene, 15 mg/L of gelatin, 10 mg/L of polyacrylamide, 0.8 g/L of sodium dodecyl sulfate, and a residual amount of the deionized water. The electrolyte pH of the surface electrodeposition was 1, the deposition temperature was 30° C., the current density was 90 mA/cm², the deposition time was 60 min, and the deposition thickness was 0.4 mm. After stacking for 3 layers, the cold rolling was performed on the graphene/copper composite deformed copper-chromium-zirconium alloy strip with the rolling deformation of 87±1% and the single rolling deformation of 10%, and the graphene/copper composite deformed copper-chromium-zirconium alloy strip with a thickness of 0.3 mm was obtained. After that, the vacuum aging treatment was performed on the graphene/copper composite deformed copper-chromium-zirconium alloy strip at an aging temperature of 400° C. and an aging time of 1 h. The graphene/copper composite deformed copper-chromium-zirconium alloy layered strip under the situation and process condition has the strength of 700±10 MPa, the electrical conductivity of 80±1% IACS, and the thermal conductivity of 750 W/m·k. The elongation after break is 10%.

The manner for preparing the electrodeposition liquid and the strip surface pretreatment are the same as in Embodiment 1.

Embodiment 3

The elemental content of the bulk copper-chromium-zirconium alloy after the solid solution consisted of 1.0 wt % of Cr, 0.1 wt % of Zr, a residual amount of Cu. The intense plastic deformation was performed on the bulk copper-chromium-zirconium alloy after the solid solution, and the low temperature rolling deformation was 98±1% after 4 passes extrusion; the single low temperature rolling deformation was 10%, and the deformed copper-chromium-zirconium alloy strip with a thickness of 0.2 mm was obtained. After that, the surface electrodeposition treatment was performed on the deformed copper-chromium-zirconium alloy strip, and the composition of the deposition liquid consisted of 120 g/L, graphene 2 g/L of copper sulfate pentahydrate, 25 mg/L of gelatin, 15 mg/L of polyacrylamide, 1.2 g/L of sodium dodecyl sulfate, and a residual amount of the deionized water. The electrolyte pH of the surface electrodeposition was 2, the deposition temperature was 30° C., the current density was 120 mA/cm², the deposition time was 120 min, and the deposition thickness was 0.4 mm. After stacking for 7 layers, the cold rolling was performed on the graphene/copper composite deformed copper-chromium-zirconium alloy strip with the rolling deformation of 92±1% and the single rolling deformation of 5%, and the graphene/copper composite deformed copper-chromium-zirconium alloy strip with a thickness of 0.5 mm was obtained. After that, the vacuum aging treatment was performed on the graphene/copper composite deformed copper-chromium-zirconium alloy strip at an aging temperature of 450° C. and an aging time of 1 h. The graphene/copper composite deformed copper-chromium-zirconium alloy layered strip under the situation and process condition has the strength of 850±10 MPa, the electrical conductivity of 85±1% IACS, and the thermal conductivity of 1200 W/m·k. The elongation after break is 20%.

The manner for preparing the electrodeposition liquid and the strip surface pretreatment is the same as in Embodiment 1.

Embodiment 4

The elemental content of the bulk copper-chromium-zirconium alloy after the solid solution consisted of 1.0 wt % of Cr, 0.1 wt % of Zr, the residual amount of Cu. The low temperature rolling deformation performed on the bulk copper-chromium-zirconium alloy after the solid solution was 98±1%; the single low temperature rolling deformation was 15%, and the deformed copper-chromium-zirconium alloy strip with a thickness of 0.2 mm was obtained. After that, the surface electrodeposition treatment was performed on the deformed copper-chromium-zirconium alloy strip, and the composition of the deposition liquid consisted of 120 g/L of copper sulfate pentahydrate, 2 g/L of graphene, 25 mg/L of gelatin, 15 mg/L of polyacrylamide, 1.2 g/L of sodium dodecyl sulfate, and the residual amount of the deionized water. The electrolyte pH of the surface electrodeposition was 2, the deposition temperature was 30° C., the current density was 120 mA/cm², the deposition time was 120 min, and the deposition thickness was 0.4 mm. After stacking for 7 layers, the cold rolling was performed on the graphene/copper composite deformed copper-chromium-zirconium alloy strip with the rolling deformation of 92±1% and the single rolling deformation of 5%, and the graphene/copper composite deformed copper-chromium-zirconium alloy strip with a thickness of 0.5 mm was obtained. After that, the vacuum aging treatment was performed on the graphene/copper composite deformed copper-chromium-zirconium alloy strip at an aging temperature of 450° C. and an aging time of 1 h. The graphene/copper composite deformed copper-chromium-zirconium alloy layered strip under the situation and process condition has the strength of 700±10 MPa, the electrical conductivity of 80±1% IACS, and the thermal conductivity of 1000 W/m·k. The elongation after break is 12%.

Embodiment 5

The elemental content of the bulk copper-chromium-zirconium alloy after the solid solution consisted of 1.0 wt % of Cr, 0.1 wt % of Zr, the residual amount of Cu. The intense plastic deformation was performed on the bulk copper-chromium-zirconium alloy after the solid solution, and the low temperature rolling deformation was 98±1% after 4 passes extrusion; the single low temperature rolling deformation was 10%, and the deformed copper-chromium-zirconium alloy strip with a thickness of 0.2 mm was obtained. After that, the surface electrodeposition treatment was performed on the deformed copper-chromium-zirconium alloy strip, and the composition of the deposition liquid consisted of 80 g/L of copper sulfate pentahydrate, 0.5 g/L of graphene, 10 mg/L of gelatin, 10 mg/L of polyacrylamide, 0.6 g/L of sodium dodecyl sulfate, and the residual amount of the deionized water. The electrolyte pH of the surface electrodeposition was 2, the deposition temperature was 30° C., the current density was 120 mA/cm², the deposition time was 90 min, and the deposition thickness was 0.4 mm. After stacking for 5 layers, the cold rolling was performed on the graphene/copper composite deformed copper-chromium-zirconium alloy strip with the rolling deformation of 92±1% and the single rolling deformation of 5%, and the graphene/copper composite deformed copper-chromium-zirconium alloy strip with a thickness of 0.5 mm was obtained. After that, the vacuum aging treatment was performed on the graphene/copper composite deformed copper-chromium-zirconium alloy strip at an aging temperature of 450° C. and an aging time of 1 h. The graphene/copper composite deformed copper-chromium-zirconium alloy layered strip under the situation and process condition has the strength of 800±10 MPa, the electrical conductivity of 76±1% IACS, and the thermal conductivity of 680±10 W/m·k. The elongation after break was 20%.

Embodiment 6

The elemental content of the bulk copper-chromium-zirconium alloy after the solid solution consisted of 1.0 wt % of Cr, 0.1 wt % of Zr, the residual amount of Cu. The intense plastic deformation was performed on the bulk copper-chromium-zirconium alloy after the solid solution, and the low temperature rolling deformation was 98±1% after 4 passes extrusion; the single low temperature rolling deformation was 10%, and the deformed copper-chromium-zirconium alloy strip with a thickness of 0.2 mm was obtained. After that, the surface electrodeposition treatment was performed on the deformed copper-chromium-zirconium alloy strip, and the composition of the deposition liquid consisted of 12 g/L copper sulfate pentahydrate, 2 g/L of graphene, 25 mg/L of gelatin, 15 mg/L of polyacrylamide, 1.2 g/L of sodium dodecyl sulfate, and the residual amount of the deionized water. The electrolyte pH of the surface electrodeposition was 2, the deposition temperature was 30° C., the current density was 120 mA/cm$^2$, the deposition time was 120 min, and the deposition thickness was 0.4 mm. After stacking for 7 layers, the cold rolling was performed on the graphene/copper composite deformed copper-chromium-zirconium alloy strip with the rolling deformation of 92±1% and the single rolling deformation of 5%, and the graphene/copper composite deformed copper-chromium-zirconium alloy strip with a thickness of 0.5 mm was obtained. After that, the vacuum aging treatment was performed on the graphene/copper composite deformed copper-chromium-zirconium alloy strip at an aging temperature of 400° C. and an aging time of 0.5 h. The graphene/copper composite deformed copper-chromium-zirconium alloy layered strip under the situation and process condition has the strength of 800±10 MPa, the electrical conductivity of 78±1% IACS, and the thermal conductivity of 800±10 W/m·k. The elongation after break is 15%.

Comparative Embodiment 1

The elemental content of the bulk copper-chromium-zirconium alloy after the solid solution consisted of 1.0 wt % of Cr, 0.1 wt % of Zr, and the residual amount of Cu. The intense plastic deformation was performed on the bulk copper-chromium-zirconium alloy after the solid solution, and the low temperature rolling deformation was 98% after 4 passes extrusion; the single low temperature rolling deformation was 10%, and the deformed copper-chromium-zirconium alloy strip with a thickness of 0.2 mm was obtained. After that, the vacuum aging treatment was performed on the graphene/copper composite deformed copper-chromium-zirconium alloy strip at an aging temperature of 450° C. for an aging time of 1 h. The graphene/copper composite deformed copper-chromium-zirconium alloy layered strip under the situation and process condition has the strength of 700±10 MPa, the electrical conductivity of 75±1% IACS, and the thermal conductivity of 550 W/m·k. The elongation after break is 15%.

Comparative Embodiment 2

The elemental content of the bulk copper-chromium-zirconium alloy after the solid solution consisted of 1.0 wt % of Cr, 0.1 wt % of Zr, and residual amount of Cu. The bulk copper-chromium-zirconium alloy was then wire-cut to produce an 1 mm thick plate. The plate was then sequentially polished with 500, 1000, 1500, and 2000 grit sandpapers to produce a copper-chromium-zirconium alloy strip with a thickness of 0.2 mm. Then, the surface electrodeposition treatment was performed on the deformed copper-chromium-zirconium alloy strip, and the composition of the deposition liquid consisted of 120 g/L copper sulfate pentahydrate, 2 g/L of graphene, 25 mg/L of gelatin, 15 mg/L of polyacrylamide, 1.2 g/L of sodium dodecyl sulfate, and the residual amount of the deionized water. The electrolyte pH of the surface electrodeposition was 2, the deposition temperature was 30° C., the current density was 120 mA/cm$^2$, the deposition time was 60 min, and the deposition thickness was 0.2 mm. The graphene/copper composite deformed copper-chromium-zirconium alloy strip with a thickness of 0.6 mm was finally obtained. After that, the vacuum aging treatment was performed on the graphene/copper composite deformed copper-chromium-zirconium alloy strip at an aging temperature of 450° C. and an aging time of 1 h. The graphene/copper composite deformed copper-chromium-zirconium alloy layered strip under the situation and process condition has the strength of 350±10 MPa, the electrical conductivity of 85±1% IACS, and the thermal conductivity of 700 W/m·k. The elongation after break is 10%.

The basic concepts have been described above, and it is apparent to those skilled in the art that the foregoing detailed disclosure serves only as an example and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. such as "an embodiment," "one embodiment," and/or "some embodiment", which means a feature, structure, or characteristic associated with at least one embodiment of the present disclosure. Accordingly, it should be emphasized and noted that the "one embodiment" "an embodiment" or "a number of embodiments" referred to two or more times in different locations do not necessarily refer to the same embodiment. In addition, certain features, structures, or characteristics in one or more embodiments of the present disclosure may be suitably combined.

Furthermore, unless expressly stated in the claims, the order of the processing elements and sequences, the use of numerical letters, or the use of other names as described in the present disclosure are not intended to qualify the order of the processes and methods of the present disclosure. While some embodiments of the invention that are currently considered useful are discussed in the foregoing disclosure by way of various examples, it is to be understood that such detail serves only an illustrative purpose, and that additional claims are not limited to the disclosed embodiments. Rather, the claims are intended to cover all amendments and equivalent combinations that are consistent with the substance and scope of the embodiments of the present disclosure. For example, although the implementation of various components described above may be embodied in a hardware device, or may also be implemented as a software only solution, e.g., an installation on an existing server or mobile device.

Similarly, it should be noted that in order to simplify the present disclosure, and thereby aiding in the understanding of one or more embodiments of the present disclosure, the foregoing descriptions of embodiments of the present disclosure sometimes group multiple features together in a single embodiment, accompanying drawings, or in a description thereof. However, this method of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of embodiments are modified in some examples by the modifiers "approximately", "nearly", or "substantially". Unless otherwise noted, the terms "approximately," "nearly," or "substantially" indicates that a ±20% variation in the stated number is allowed. Correspondingly, in some embodiments, the numerical parameters used in the present disclosure and claims are approximations, which are subject to change depending on the desired characteristics of individual embodiments. In some embodiments, the numerical parameters should consider the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, manuals, publications, documents, etc., the entire contents of which are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to this specification and those set forth herein, the descriptions, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for preparing a graphene/copper composite deformed copper-chromium-zirconium alloy layered strip, comprising: obtaining a deformed copper-chromium-zirconium alloy strip by performing a solid solution treatment on a bulk copper-chromium-zirconium alloy, and performing a room temperature equal channel extrusion and a low temperature rolling on the bulk copper-chromium-zirconium alloy after the solid solution treatment; obtaining a graphene/copper composite deformed copper-chromium-zirconium alloy strip by preparing a graphene/copper composite deposition liquid and performing a surface electrodeposition treatment on the deformed copper-chromium-zirconium alloy strip; obtaining the graphene/copper composite deformed copper-chromium-zirconium alloy layered strip with a rolling deformation of 65%-95% by stacking the graphene/copper composite deformed copper-chromium-zirconium alloy strips for 3-7 layers; and then performing a cold rolling; wherein a single rolling deformation is 5%-10%; and performing a vacuum aging on the graphene/copper composite deformed copper-chromium-zirconium alloy layered strip.

2. The method of claim 1, wherein an elemental composition of the bulk copper-chromium-zirconium alloy is 0.5 wt %-1.0 wt % of Cr, 0.05 wt %-0.1 wt % of Zr, and a residual amount of Cu; a thickness of the bulk copper-chromium-zirconium alloy is 1-1.2 cm; a solid solution temperature in the solid solution treatment is 1000° C.-1050° C., the method further comprising:
after the bulk copper-chromium-zirconium alloy is held at a temperature of 1000° C.-1050° C. for 0.5-1 h, performing a quenching on the bulk copper-chromium-zirconium alloy with a deionized water.

3. The method of claim 1, wherein a number of processing times of the room temperature equal channel extrusion is 1-4; the low temperature rolling is performed after the bulk copper-chromium-zirconium alloy is soaked in liquid nitrogen for 5-10 min; a low temperature rolling deformation of the bulk copper-chromium-zirconium alloy is 98±1%, and a single low temperature rolling deformation is 10%-15%, and a thickness of the deformed copper-chromium-zirconium alloy strip is 0.2-0.3 mm.

4. The method of claim 1, wherein a composition of the graphene/copper composite deposition liquid includes: 80-120 g/L of copper sulfate pentahydrate, 0.5-2 g/L of graphene, 5-25 mg/L of gelatin, 5-15 mg/L of polyacrylamide, 0.6-1.2 g/L of sodium dodecyl sulfate, and a residual amount of a deionized water.

5. The method of claim 1, wherein a preparation manner of the graphene/copper composite deposition liquid includes:
mixing copper sulfate pentahydrate, gelatin, and the polyacrylamide and dispersing for 30 min at a speed of 200 r/min by mechanically stirring to obtain a solution containing the copper sulfate pentahydrate;
mixing graphene and sodium dodecyl sulfate to obtain a mixture, performing an ultrasonic dispersion on the mixture for 30 min, and then performing a high-speed homogeneous dispersion for 60 min at a speed of 4000 r/min to obtain a graphene suspension;
mixing the solution containing the copper sulfate pentahydrate with the graphene suspension, stirring mechanically, and then performing the high-speed homogeneous dispersion by stirring using an electric mixer to obtain the graphene/copper composite deposition liquid.

6. The method of claim 1, wherein before performing the surface electrodeposition treatment, sequentially sanding a surface of the deformed copper-chromium-zirconium alloy strip with 500, 1000 and 1500 grit sandpaper, and pickling and activating the surface of the deformed copper-chromium-zirconium alloy strip with an activation fluid; wherein components of the activation fluid consists of: 30 mL hydrochloric acid and 300 ml deionized water.

7. The method of claim 1, wherein the surface electrodeposition treatment adopts a direct current electrodeposition manner, an electrolyte pH of the surface electrodeposition is 1-2.5, an electrolyte temperature is 20° C.-50° C., a current density is 60-120 mA/cm$^2$, and a deposition time is 60-120 min; a single-layer graphene composite copper thickness of the graphene/copper composite deformed copper-chromium-zirconium alloy strip is 0.1-0.4 mm.

8. The method of claim 1, wherein a vacuum degree of the vacuum aging is $10^{-5}$ Pa, an aging temperature is 400° C.-450° C., and an aging holding time is 0.5-1 h; and the graphene/copper composite deformed copper-chromium-zirconium alloy layered strip heats up and cools down with a furnace.

9. A graphene/copper composite deformed copper-chromium-zirconium alloy layered strip prepared according to the method of claim 1.

* * * * *